(12) United States Patent
Vemury

(10) Patent No.: US 11,696,012 B2
(45) Date of Patent: Jul. 4, 2023

(54) PRIVACY PROTECTED IMAGE AND OBSCURATION SYSTEM

(71) Applicant: The Government of the United States of America, as represented by the Secretary of Homeland Security, Washington, DC (US)

(72) Inventor: Arun Vemury, North Bethesda, MD (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/590,626

(22) Filed: Feb. 1, 2022

(65) Prior Publication Data

US 2022/0159176 A1 May 19, 2022

Related U.S. Application Data

(63) Continuation of application No. 17/213,851, filed on Mar. 26, 2021, now Pat. No. 11,277,557.

(60) Provisional application No. 63/005,861, filed on Apr. 6, 2020.

(51) Int. Cl.
| | | |
|---|---|---|
| *H04N 5/232* | (2006.01) | |
| *H04N 5/262* | (2006.01) | |
| *H04N 23/611* | (2023.01) | |
| *H04N 5/272* | (2006.01) | |
| *H04N 23/51* | (2023.01) | |
| *H04N 23/60* | (2023.01) | |

(52) U.S. Cl.
CPC ........... *H04N 23/611* (2023.01); *H04N 5/272* (2013.01); *H04N 23/51* (2023.01); *H04N 23/64* (2023.01); *G06T 2207/20008* (2013.01); *G06T 2207/20224* (2013.01)

(58) Field of Classification Search
CPC . G06T 2207/20012; G06T 2207/20081; G06T 2207/20224
USPC ..................................................... 348/207.99
See application file for complete search history.

(56) References Cited

U.S. PATENT DOCUMENTS

| | | | | |
|---|---|---|---|---|
| 8,345,921 | B1 * | 1/2013 | Frome ................. | G06V 10/768 |
| | | | | 382/105 |
| 8,867,853 | B2 | 10/2014 | Migdal | |
| 9,223,995 | B1 * | 12/2015 | Lavinio ................. | G06F 21/606 |
| 2008/0068500 | A1 | 3/2008 | Krause | |

(Continued)

FOREIGN PATENT DOCUMENTS

EP        3188058 A1 *   7/2017   ............. G06F 19/00

OTHER PUBLICATIONS

Otto, Nate et al., Verifiable Credentials Use Cases, W3C Working Group Note Sep. 24, 2019, https://www.w3.org/TR/2019/NOTE-vc-use-cases-20190924.

*Primary Examiner* — Anthony J Daniels
(74) *Attorney, Agent, or Firm* — Lavanya Ratnam; Robert W. Busby; Nathan Grebasch

(57) ABSTRACT

Systems and methods are disclosed and an example system includes a digital image receiver for receiving a digital image, and an automatic obscuration processor coupled to the image receiver and configured to determine whether the digital image includes a region that classifies as an image of a category of object and, upon a positive determination, to obscure the region and output a corresponding obscured-region digital image.

28 Claims, 11 Drawing Sheets

(56) References Cited

U.S. PATENT DOCUMENTS

| | | |
|---|---|---|
| 2008/0180539 A1 | 7/2008 | Jung et al. |
| 2010/0328460 A1* | 12/2010 | Merkel .................. G06V 20/52 |
| | | 348/143 |
| 2011/0085035 A1* | 4/2011 | Choi .................... H04N 19/159 |
| | | 382/164 |
| 2015/0145992 A1 | 5/2015 | Träff |
| 2015/0227805 A1 | 8/2015 | Stokman |
| 2016/0019415 A1 | 1/2016 | Ra et al. |
| 2019/0042871 A1 | 2/2019 | Pogorelik |
| 2019/0068895 A1* | 2/2019 | Hutz .................... G06K 9/6274 |
| 2020/0184098 A1* | 6/2020 | Andrasick ............ G06K 9/6271 |
| 2020/0211348 A1 | 7/2020 | Wang |
| 2021/0035342 A1 | 2/2021 | Glaser et al. |
| 2021/0056312 A1 | 2/2021 | Lu |
| 2021/0067694 A1 | 3/2021 | Alshurafa et al. |
| 2021/0092387 A1 | 3/2021 | Edpalm et al. |

* cited by examiner

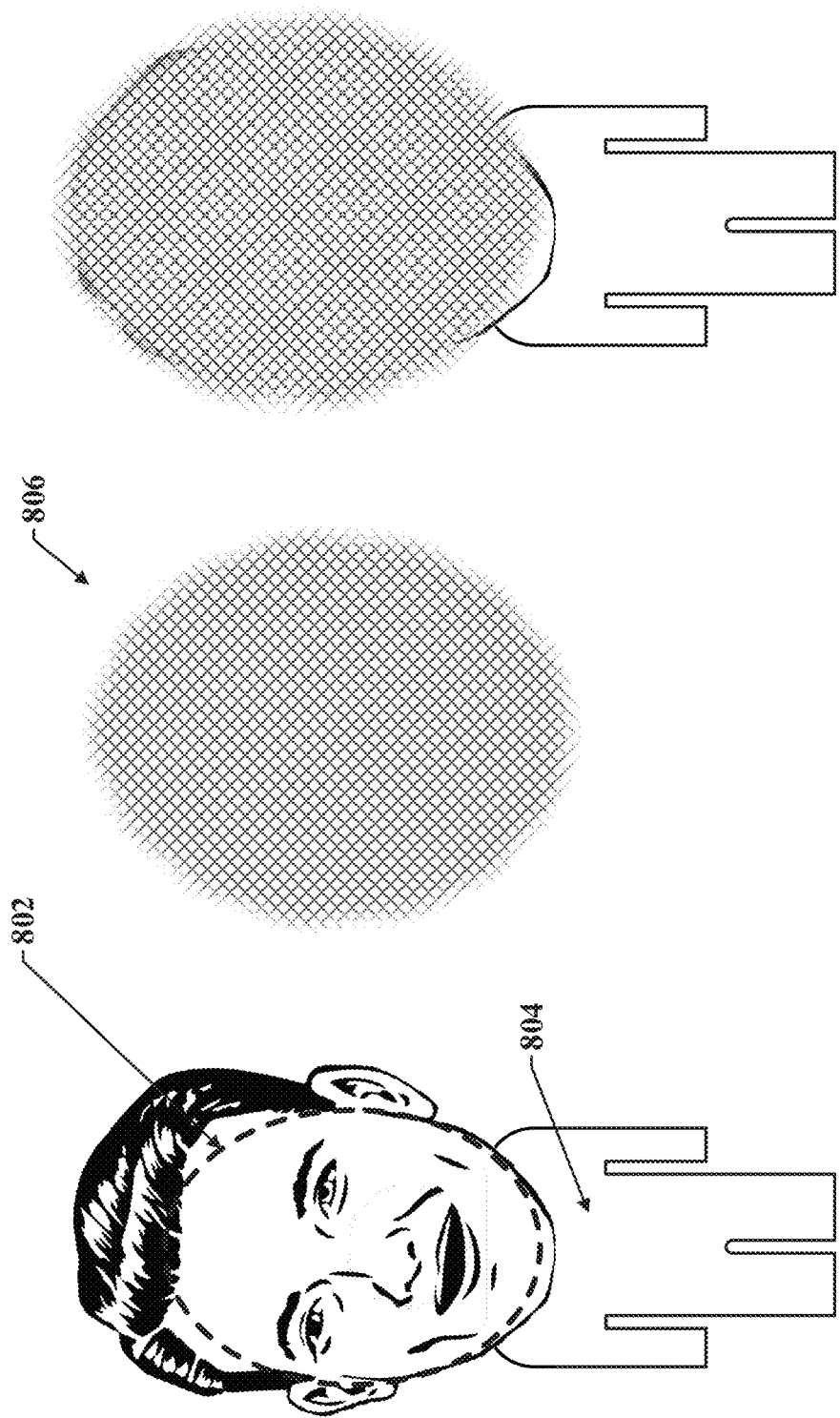

PRIVACY PROTECTED IMAGE AND OBSCURATION SYSTEM

CROSS-REFERENCE TO RELATED APPLICATIONS

This application claims the benefit under 35 U.S.C. § 120 to U.S. patent application Ser. No. 17/213,851 filed Mar. 6, 2021, which claims the benefit of priority under 35 U.S.C. § 119(e) to U.S. Provisional Patent Application No. 63/005,861, filed Apr. 6, 2020, entitled "Privacy-Aware Capture and Device," the disclosures of both of which are hereby incorporated by reference in their entirety.

STATEMENT OF GOVERNMENT INTEREST

The present invention was made by employees of the United States Department of Homeland Security in the performance of their official duties.

FIELD

The present disclosure relates generally to privacy aspects of image capture.

BACKGROUND

Image capture devices such as video cameras can promote public safety and security. However, some applications may present arguable concerns as to privacy. Some concerns may arise from risk, or perceived risk, of unauthorized access to or distribution of feeds from image capture devices. Such concerns or perceptions can be elevated for image capture devices that due to desired of meeting the devices' purposes of public safety and security, capture personal identifiable information (PII). Examples of PII that can be captured can include, but are not limited to, the geometry and other features of persons' faces, automobile license plate numbers, and personal name tags.

SUMMARY

Systems are disclosed and one example can include a digital image receiver configured to receive a digital image, and an automatic obscuring processor, coupled to the image receiver configured to determine whether the digital image includes a region that classifies as an image of a category of object and, upon a positive determination, to obscure the region and output a corresponding obscured-region digital image.

Methods are disclosed and one example can include receiving a digital image, determining whether the digital image includes a region that classifies as an image of a category of object and, upon a positive determination obscuring the region and outputting a corresponding obscured-region digital image.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The drawing figures illustrate one or more implementations in according with the teachings of this disclosure, by way of example, not by way of limitation. In the figures, like reference numbers refer to the same or similar elements. It will be understood that the drawings are not necessarily to scale.

FIG. 8A shows example aspects of a random subject, including an example head and a face, positioned above an abstracted torso, the face being an example identity-correlated object for subsequent processing.

FIG. 8B shows an example object obscuring in accordance with the present disclosure, corresponding to the FIG. 8A face.

FIG. 8C shows an example replacement privacy preserving image, with an obscuring of the face, resulting from modifications of the FIG. 8A image, based at least in part on the FIG. 8B obscuring.

DETAILED DESCRIPTION

Figure 1:
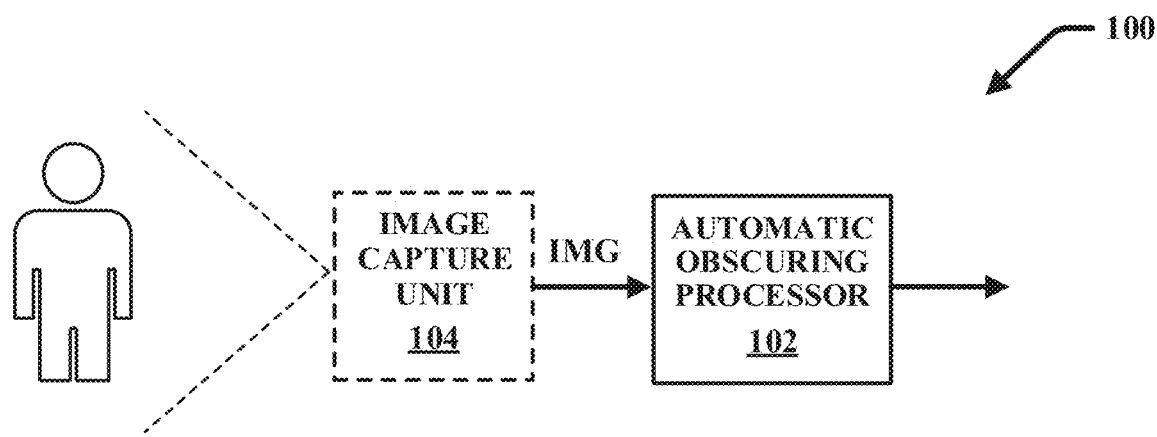
FIG. 1 shows a simplified functional block schematic of an example system for privacy-aware image capture in accordance with the present disclosure.

Aspects and features of disclosed systems and methods for privacy protection image capture include, but are not limited to, automatic detection of instances, in a digital image captured by a digital camera, of identity-correlated objects and, in response, outputting a privacy-protected image that obscures regions detected as having an identity-correlated objects. Embodiments can include, among other privacy protective features, no output of the originally captured image, and not storing or maintaining the originally captured image nor any copy of that image is stored or maintained.

For simplicity, "region(s) of an image detected as likely including an identity-correlated object" and variations thereof may be referred to as "identity-correlated regions."

Embodiments can feature irreversible obscuring of identity-correlated regions. Embodiments can feature reversible obscuring, and combinations of reversible and irreversible obscuring. Embodiments can be configured to detect what may be a library of identity-correlated objects. Embodiments can feature generic, single-category detection, and obscuring. Various embodiments can include classification of identity-correlated regions into one among a plurality of categories. Example categories of identity-correlated objects can include, without limitation, persons' faces, tattoos, name tags, and license plate numbers. One or more embodiments can feature category-specific obscuring, e.g., using respectively different obscuration types on different categories of identity-correlated regions.

Embodiments can feature detection of a particular pattern or arrangement of objects. The objects forming the particular pattern, standing alone, may be identity-correlated objects. One more of the objects forming the particular pattern may be a non-identity correlated category of object. In embodiment features can include at least partially obscuring the particular pattern.

One more embodiments can provide, for captured moving picture images, digital processing resource conservation features, for example, without limitation, applying identity-correlated object detection to 1 out of R of the sequence of digital image frames (hereinafter "frames") of an M frame-per-second image, with R and M being integers. Implementations can include detecting of moving objects, estimating of location within subsequent frames of detected moving objects and corresponding real-time obscuring utilizing estimated locations.

Embodiments can feature a plurality of different key-based reversible obscuring processes, which can be selected from and applied based on the detected category of identity-correlated regions. Embodiments can further a key management feature, in which certain entities can be provided decryption keys to certain among the different key-based reversible obscuring processes.

Embodiments can include a security housing that encloses a photodetector pixel array coupled to a particularly configured processing resource, the configuration providing within the security housing privacy-aware obscuring of identity-correlated regions, and corresponding transmission out from the housing of a replacement, privacy preserving image.

FIG. 1 shows a simplified functional block schematic of a system 100 that can provide, among other features, privacy-aware image capture and various aspects thereof in accordance with the present disclosure. Implementations of the system 100 can include an identity-correlated region obscuring logic 102, which can be configured to receive, e.g., from an image capture device 104, an image (labelled "IMG" in the figure) of a subject, such as the example person labeled in the figure as "SB"). It will be understood that "IMG" and "SB" are arbitrary labels having no intrinsic meaning.

Embodiments can feature identity-correlated region obscuring logic 102 configured to detect identity-correlated regions using one or more likelihood threshold-based classification processes. The numerical value of "likely" can be application-specific. Factors can include application-specific ranges of acceptability of false positive and of false negative.

Regarding object detection configuration of the identity-correlated region obscuring logic 102, in an embodiment logic 102 can utilize, as one example, the Viola Jones algorithm. Published descriptions of the Viola Jones algorithm are readily available, and persons of ordinary skill in the relevant arts, upon reading the present disclosure in its entirety, can adapt the published algorithm to practices in accordance with the present teachings. Detailed description of the Viola Jones algorithm is therefore omitted. Of academic interest, an example description can be found in H. Viola and M. Jones, Robust Real-Time Object Detection, *Second International Workshop on Statistical and Computational Theories of Vision—Modeling, Learning, Computing, and Sampling*, July 2001.

Another example implementation of the object detection configuration of the identity-correlated region obscuring logic 102 the Kanade-Lucas-Tomasi (KLT) object tracking algorithm to detect, classify, and determine location of privacy-correlated regions. Published descriptions of the KLT algorithm are readily available, and persons of ordinary skill in the relevant arts, upon reading the present disclosure in its entirety, can adapt the KLT algorithm to practices in accordance with the present teachings. Detailed description of the KLT algorithm is therefore omitted. Of academic interest, an example description is given in R. Shi and C, Tomasi, Good Features to Track, *IEEE Conference on Computer Vision and Pattern Recognition*, 1994.

In an embodiment, the identity-correlated region obscuring logic 102 can be configured to use one or more neural network object detection and classification processes. Examples include, but are not limited to, region-based Convolutional Neural Networks (R-CNN), Fast R-CNN, and Faster R-CNN. Published descriptions of the R-CNN, Fast R-CNN, and Faster R-CNN are readily available and persons of ordinary skill in the relevant arts, upon reading the present disclosure in its entirety, can adapt any one or more of the above-identified published CNN algorithms to practices in accordance with the present teachings. Detailed description of the example CNN algorithms, R-CNN, Fast R-CNN, and Faster R-CNN is therefore omitted. Of academic interest, an example description of R-CNN can be found in Uijlings, J. R., et al., Selective Search for Object Recognition, *International Journal of Computer Vision* 104.2 (2013); an example description of Fast R-CNN can be found in R. Girshick, Fast R-CNN, *Microsoft Research,* 2015; and an example description of Faster R-CNN can be found in S. Ren, et al., Faster R-CNN: Towards 14 Real-time Object Detection with Region Proposal Networks, *Neural Information Processing Systems (NIPS)*, 2015.

Regarding obscuring process configurations of the identity-correlated region obscuring logic 102, the logic can be configured to obscure detected identity-correlated regions via one or more types of reversible obscuring, or via one or more types of irreversible obscuring. The identity-correlated region obscuring logic 102 can be configured to apply category-specific selected obscuring, for example, among different types of reversible obscuring, different type of irreversible obscuring, or both.

Features of the identity-correlated region obscuring logic 102 can include non-reversible obscuring and can include non-reversible or substantially non-reversible blurring, for example, digital blurring, or pixilation. The obscuring can render the obtaining of useful privacy related data to be computationally impractical. Obscuring processes provided by the logic 102 can be configured to irreversibly remove or destroy the identity-related information content from all of the detected identity-correlated region, or from certain categories of such regions.

less than the original identity-correlated region. This can be a factor in selecting and configuring the object detection and localization algorithm(s) to include in the identity-correlated region obscuring logic 102, because different object detection and localization algorithm(s), including different ones among the example algorithms identified above, can exhibit different performance with respect to object detection boundary and localization.

TABLE 1

| Alteration | Remediation Strategies | |
| --- | --- | --- |
| Strategies | Capture-Based Remediation | Algorithm-Based Remediation |
| Reversible distortion | Privacy related data protected through distortion by edge processing; with authorized use key can be subsequently be restore | Post-processing of media distorts privacy data, but authorized key use can restore |
| Irreversible distortion | Permanent distortion introduced by edge processing | Post-processing of media permanently distorts PII |

The identity-correlated region obscuring logic 102 can be configured to obscure via distortion. The logic 102 can be configured to apply reversible distortion, or irreversible distortion, or to select between such types based on category. Processes of reversible distortion and irreversible distortion applied by the identity-correlated region obscuring logic 102 can include permanent replacement of the original data, e.g., the privacy related data, with new data. The identity-correlated region obscuring logic 102 can be configured to generate the new data as a reversible algorithmic distortion, e.g., key-based encryption, of the original data. The logic 102 can be configured to generate the new data by an irreversible distortion, e.g., pixilation or Gaussian blurring of the original data. In an embodiment, the identity-correlated region obscuring logic 102 can be configured generate, in a process of irreversible obscuring, the new data as a synthesized object. The generation can use, for example, a generative adversarial network (GAN) technique. One example can be, but is not limited to, the StyleGAN system available from Nvidia, Inc., 2788 San Tomas Expy, Santa Clara, Calif. 95051.

The identity-correlated region obscuring logic 102 can be configured to obscure via generating new data via a process independent of the data in the identity-correlated region. On example can be making data, e.g., replacing all pixels in the region with a pre-defined mask.

In accordance with one or more embodiments, both for non-reversible obscuring and reversible obscuring, the original data can be discarded, e.g., all instances erased from processor memory.

In one or more embodiments, configuring the identity-correlated region obscuring logic 102 can include determining an acceptable spatial resolution, e.g., details of boundary contour, of identity-correlated regions as detected by the logic 102. Related to this, a configuring of the identity-correlated region obscuring logic 102 can include determining an acceptable accuracy in spatial registration, i.e., location and orientation, between identity-correlated regions as detected by the logic 102, and the actual location and orientation of the region in the image. One reason is that logic 102 obscuring processes, in an aspect, obscure identity-correlated regions as detected by the logic 102. Misregistration and other spatial differences of between such regions and the identity-correlated regions as they appear in the original image can result in obscuring more or obscuring The image IMG received from image capture device 104 can be a still image, or can include a sequence of images, i.e., a moving picture image. A moving picture IMG can be an event triggered, e.g., motion-triggered image capture. In one more embodiments, the identity-correlated region obscuring logic 102 can include technical features that provide, among other benefits, reduced computation processing of moving picture IMGs. Technical features can enable real time privacy-protective various frame rates of moving picture IMGs, and examples can include or encompass a range extending from approximately 20 frames per second (fps), or perhaps less than 20 fps, up to, for example, 100 fps or higher. These are only examples, but in various applications applying the same identity-correlated region detection and classification process, and same obscuring process to each frame may carry an undesirable computation burden. In an embodiment the identity-correlated region obscuring logic 102 can be configured to apply a faster, less accurate object detection, localization, and classification processes to some frames, and apply less often a more accurate object detection, localization, and classification processes (e.g., every 10th frame). In an embodiment, if an identity-correlated region is detected in the frame, an obscuration process can obscure a corresponding region in number of frames succeeding and a number of frames preceding the frame.

In an embodiment, the identity-correlated region obscuring logic 102 can be configured to receive compressed moving picture IMGs, e.g., H.264 (also referred to as MPEG-4), H.265 format, from the image capture device 104. The logic 102 can be further configured to detect identity-correlated regions within the compressed moving picture IMG, and to output a compressed moving picture privacy-protected image.

As understood by persons of ordinary skill in the pertinent arts, compression algorithms such as H.264, H.265, and others compress by removing certain frame to frame image redundancy. Operations include replacing sequences of full frames with what may be termed a spaced sequence, as it includes full frames spaced apart by image-change frames. Published description of the H.264 and H.265 formats are readily available and therefore detailed description is omitted from this disclosure. Of academic interest, an example description of H.264 can be found in D. Marpe, et al., The H.264/MPEG4 Advanced Video Coding Standard and Its Applications, *IEEE Communications Magazine*, September 2006.

Operations in various implementations of protection processes provided by one or more embodiments can include certain interface with, for example, the H.264 and H.265 format. In these formats, and others, full frames are referred to as "I" frames and the image-change frames are referred to as "P" frames and "B" frames. In one embodiment, features of system 100 can include a compression coder-decoder (CODEC) that can convert the compressed moving picture IMG to an uncompressed format, and then via the identity-correlated region obscuring logic 102, perform the above-described detection and obscuration of identity-correlated regions, followed compressing the output privacy-protected moving IMG back to the compressed format, e.g., H.264 or H.265. In another embodiment, the identity-correlated region obscuring logic 102 can be configured to apply the above-described detecting to I frames, generate new data for the I frames' detected identity-correlated regions, generate P frame versions, or P frame and B frame versions of the new data, and then output a privacy protected H.264 or H.265 moving picture IMG. One or more embodiments can configure the identity-correlated region obscuring logic 102 to switch between a CODEC mode, i.e., decode, then apply detection and obscuring, then encode, and a compressed format mode, i.e., operate directly on the compressed moving IMG.

It will be understood that the graphic blocks in FIG. 1 represent logic functions and do not necessarily define or limit hardware architecture. For example, the identity-correlated region obscuring logic 102 can be integrated within the image capture device 104. In another implementation, the identity-correlated region obscuring logic 102 and image capture device 104 can within a security housing, to resist direct access to the output of the image capture device 104. In another implementation, a plurality of image capture devices 104 can be provided, each configured to feed encrypted image data to a shared resource implementing the identity-correlated region obscuring logic 102. The shared resource implementing the identity-correlated region obscuring logic 102 can be configured to receive and decrypt the outputs of all the image capture devices 104, apply the above-described identity-correlated region obscuring operations to each, and output a corresponding plurality of privacy-protected images. The shared resource implementation of the identity-correlated region obscuring logic 102 can feature, as described above, no output and no storage of identity-correlated region data received from any of the plurality of image capture devices.

Implementations of the identity-correlated region obscuring logic 102 can include, for example, a programmable processor that can be coupled to or can otherwise have access to an instruction memory. The instruction memory can include a tangible medium that can store processor-executable instructions that can cause the processor to perform various processes and operations thereof, in methods described in greater detail in later sections.

Referring to the FIG. 1 image capture device 104, it will be understood that the device 103 can be configured for image capture in various spectra. Example spectra can include, without limitation, visible light imaging, non-visible light imaging, e.g., one or more of the infra-red bands, and millimeter wave imaging. It will be understood that "image(s)," as used herein, can include visible light representations or translations of images originally captured in other spectra. The image capture device 104 can be configured to include light amplification (e.g., "night-vision") imaging.

Figure 2:
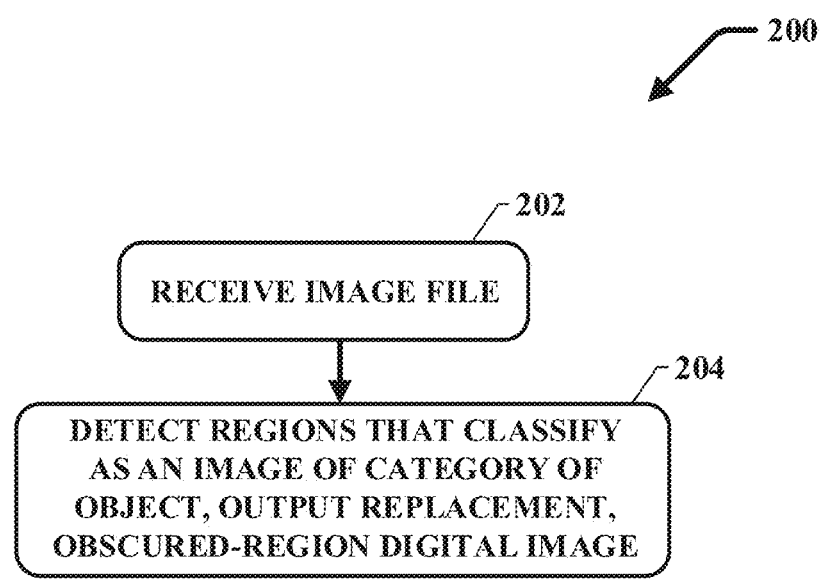
FIG. 2 shows a logic flow chart for operations in a process in one or more methods for privacy-aware image capture in accordance with the present disclosure.

FIG. 2 shows a logic flow chart representing a flow 200 in operations in one or more methods for privacy-aware image capture in accordance with the present disclosure. Description of operations in the flow 200 includes references to FIG. 1. The references are for purposes of convenience and are not intended to limit practices of the flow 200 to the FIG. 1 system.

Upon receiving 202 a digital image, e.g., IMG from the FIG. 1 image capture device 104, the flow 200 can proceed to detecting and obscuring 204. In an embodiment, operation in the detecting and obscuring 204 can include the identity-correlated region obscuring logic 102 applying threshold-based object detection of identity-correlated regions, generation of a new or replacement data for each of the regions and outputting a privacy-protected image in which all detected identity-correlated regions are obscured. As described above, the identity-correlated region obscuring logic 102 can be configured to use or apply, in its detecting of identity-correlated regions, operations according to the Viola Jones algorithm, or operation according to a CNN algorithm, such as R-CNN, Fast R-CNN, or Faster R-CNN, or various combinations thereof. As also described above, region obscuring operations operation in the detecting and obscuring 204, e.g., by the identity-correlated region obscuring logic 102, can include reversible obscuring, e.g., public key encryption, or irreversible obscuring, e.g., digital blurring, or pixilation. The obscuring can to an extent that, except for regions reversibly obscured by a process for which a receiving entity has authority to access, obtaining useful privacy related data can be computationally impractical.

As also described above, if the image received at 202 is a moving image, operations in the detecting and obscuring 204 may configured to interface a compression process, e.g., H.264 or H.265, or others. In an embodiment, operations in the detecting and obscuring 204 may be configured to provide a compression process, such as but not limited to, H.264 or H.265, or others. For example, in an embodiment, detecting and obscuring 204 operations can be applied to every $r^{th}$ frame. In the $r^{th}$ frames, example operations can include detecting every identity-correlated region, and applying to such regions obscuring operations, as described above. Such operations can include generating a new data for the region's location in the $r^{th}$ frame. In an embodiment, for obscuring using, e.g., reversible encryption, detecting and obscuring 204 operations can generate a per-frame movement data, for a motion-compensated, shifted location version of the new data for obscuring the region in the intervening frames. Also, if the image received at 202 is a compressed moving image, e.g., an H.264 or H.265 format image, one or more embodiments can operate on the compressed image, e.g., applying in the detecting and obscuring 204 operations of detecting and generating new data for identity-correlated regions in the full or I frames, generating P frame versions of the new data, and outputting a privacy protected H.264 or H.265 image, using the full frame new data and the P frame versions of the new data. In an aspect, operations in the detecting and obscuring 204 can include generating B frame versions of the new data.

The type of obscuring used in the detecting and obscuring 204 can be automatically selected in accordance with the detected category. For example, the detecting and obscuring 204 can include automatic selecting among a plurality of different, category-specific types of reversible obscuring. In another example, the detecting and obscuring 204 can be configured to include an automatic category-specific selecting between irreversible obscuring and reversible obscuring. In an embodiment the obscuring processes in the detecting and obscuring 204 can be category-specific selection between reversible and irreversible, as well as selection among different types of reversible obscuring, or different types of irreversible obscuring, or both. One example can include selecting irreversible obscuring for regions determined likely to have objects of any category within one group, and reversible obscuring for regions determined likely to have objects of any category within another group.

Figure 3:
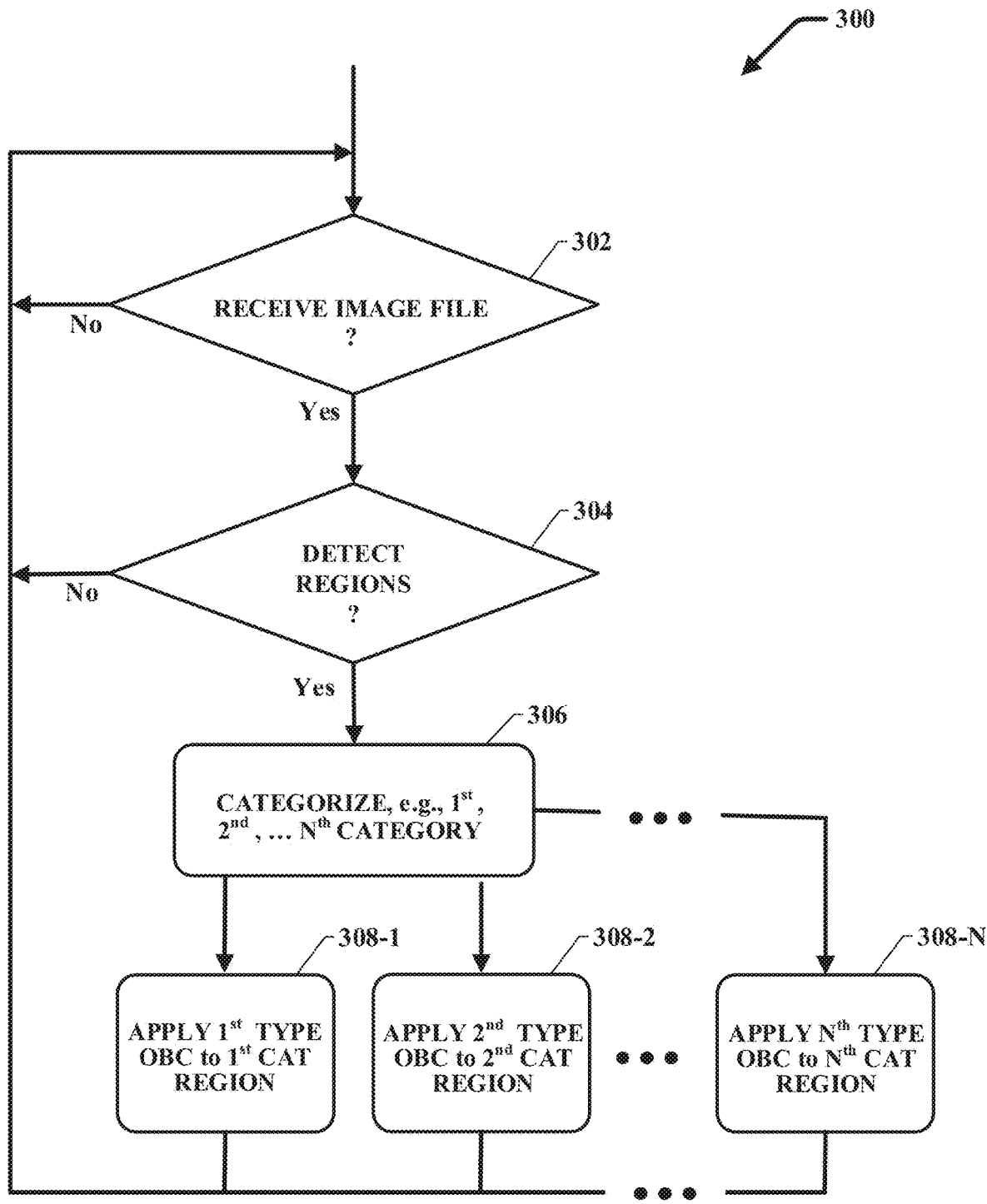
FIG. 3 shows a logic flow chart for various operations in another process in one or more methods for privacy-aware image capture in accordance with the present disclosure, which includes an implementation of a multiple category obscuring feature.

FIG. 3 shows a logic flow chart for a flow 300 of operations in another process in a privacy-preserving image capture in accordance with the present disclosure. The flow 300 assumes the above-identified configuration of the identity-correlated region obscuring logic 102 that includes categorizing of the identity-correlated regions and category-specific obscuring. The flow 300 also assumes the identity-correlated region obscuring logic 102 is configured to detect instances of identity-correlated information within any of N categories, N being a positive integer.

In an instance of the flow 300, operation can proceed from receiving 302 an image file, e.g., an IMG from the FIG. 1 image capture device 104, to detecting 304 whether any identity-correlated regions are present in the image. If the detecting 304 result is "No," the flow 300 can return to 302. In an aspect, if the detecting 304 result is "Yes" the flow 300 can proceed to categorizing 306, which can include determining which of the N categories into which the detected identity-correlated region fits. It will be understood that the FIG. 3 depiction of the detecting 304 and categorizing 306 as separate blocks, and the sequential description above of the detecting 304 and categorizing 306 is not intended to limit the detecting 304 and categorizing 306 to any grouping or sequencing. For example, as described above, in one or more implementations the determining of the category of an identity-correlated region category within an image can be integral with detecting the region's presence.

The detecting 304 and categorizing 306 are not limited to a single identity-correlated region, and instead can include detecting a plurality of separate identity-correlated regions in the image. Also, in an embodiment, the identity-correlated region obscuring logic 102 can be configured to detect, and to apply commensurate obscuring to particular combinations of identity-correlated regions. For example, a visible first name brand logo or insignia on a first type of apparel, e.g., a shirt, in combination with a visible second name brand logo or insignia on a second type of apparel, e.g., a headband, may be well enough associated with a particular person to be personal identity information.

Upon the categorizing 306 of detected identity-correlated regions in the image, the flow 300 can proceed, for each detected identity-correlated regions, to an $n^{th}$ type obscuring 308-$n$ of the region. The "n" can be according to the region's category. For example, upon detecting 304 and categorizing 306 an instance of a first category identity-correlated region, the flow 300 can proceed to a first type obscuring 308-1 for the region. Upon detecting 304 and categorizing 306 an instance of a second category identity-correlated region, the flow 300 can proceed to a second type obscuring 308-2 for the second category region. For purposes of description, the first type obscuring 308-1, second type obscuring 308-2, . . ., $n^{th}$ type obscuring 308-$n$ can be collectively referenced as "obscuring types 308."

An example will assume a received image that includes two more instances of first category identity correlated regions and two or more instances of second category identity-correlated regions. The flow 300 can be configured to apply a first type obscuring 308-1 to each of the two or more first category identity-correlated regions and to apply a second type obscuring 308-2 to each of the two or more second category identity-correlated regions. The two instances of the first type obscuring 308-1 are not necessarily mutually identical, and the two instances of the second type obscuring 308-2 are not necessarily mutually identical. For example, assuming the first type obscuring 308-1 is a key-based encryption reversible obscuring, one instance of the first type obscuring 308-1 applied to one of the two or more first category identity-correlated regions may use a different encryption key than an instance of the first type obscuring 308-1 applied to another of the two or more first category identity-correlated regions.

As described above, in an embodiment the detecting 304 or the categorizing 306, or both, can be configured to determine whether the digital image includes a particular combination of regions that individually classify as an image of a category of object. An embodiment can include, together with determining whether the digital image includes the particular combination of regions, a corresponding configuring of an obscuring or a combination obscuring. For example, the first type obscuring 308-1 or the second type obscuring 308-2 can be configured such that, in response to a positive determination by the detecting 304 or the categorizing 306, or both, that the image includes a combination of regions that, together, constitute personal identification information, one or more of the constituent regions can be obscured. In one or more embodiments, detection of combinations of regions constituting personal identification information can include detecting particular positionings, e.g., patterns of the constituent regions. In such embodiments, the obscuring of one or more of the constituent regions can include at least partial obscuring of the particular positioning.

Figure 4:
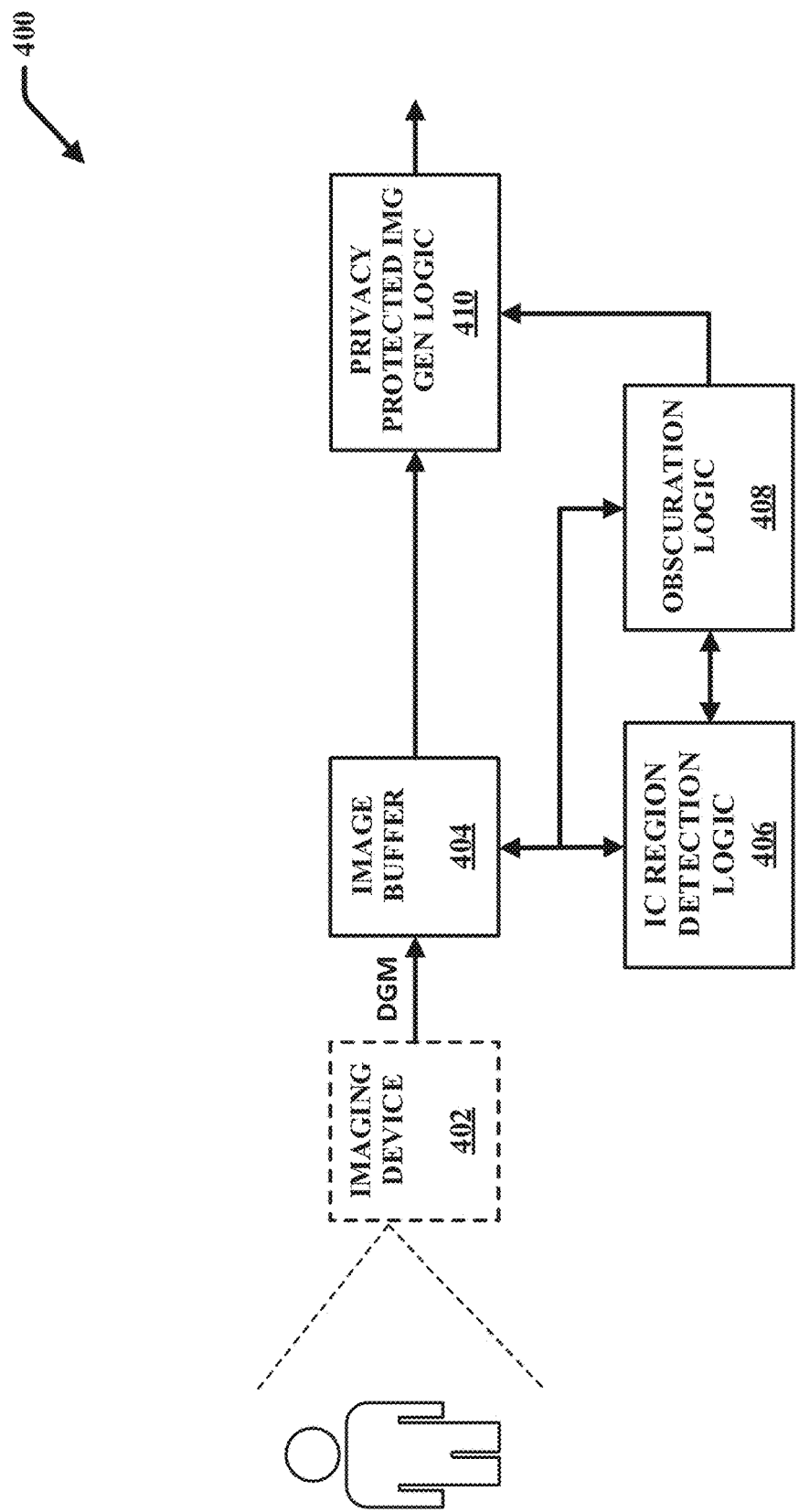
FIG. 4 shows a simplified functional block schematic of another system for privacy-aware image capture in accordance with the present disclosure, employing aspects of the FIG. 1 block schematic, and showing one configuration for the identity-correlated object obscuring logic.

FIG. 4 shows a simplified functional block schematic of an implementation of another system 400 for privacy-aware image capture in accordance with the present disclosure. The system 400 can receive an image data from an imaging device 402, such as but not limited to the FIG. 1 image capture device 104. In an embodiment, the system 400 can include an image buffer 404, an identity-correlated region detection logic 406, an obscuring logic 408, and a privacy protected image output logic 410. The image buffer 404 can be separate from or can be integrated with the identity-correlated region detection logic 406, or obscuring logic 408. The identity-correlated region detection logic 406 can be configured to detect one or more identity-correlated object categories. Example categories can include, but are not limited to, human faces, nametags, tattoos, and automobile license plate numbers.

In an embodiment, the identity-correlated region detection logic 406 can be configured to determine, for each detected instance of an object category, certain information about the instance. For purposes of description, such information will be alternatively referred to as "category instance information." Examples of category instance information can include, without limitation, the instance's location, shape, geometry, dimension, or any combination or sub-combination thereof. The identity-correlated region detection logic 406 can be configured to provide the category instance information to the obscuring logic 408 or to the privacy protected image output logic 410, or both.

In an embodiment, obscuring logic 408 can be configured to generate obscuring data based at least in part on the above-described category instance information from the identity-correlated region detection logic 406.

In an embodiment, the obscuring logic 408 can be configured to generate obscuring data in a format and with an informational content that can be based a plurality of factors. One example factor can be the specific detected identity-correlated object category. Another factor can be whether the obscuring is reversible or irreversible. For purpose of description the factor of the specific detected identity-correlated object category can be referred to as a "first" factor. The first factor may be independent. The factor of whether the obscuring is reversible or irreversible can be referred to as a "second" factor. In an embodiment, the second factor can be dependent at least on part on the first factor.

In an embodiment, the obscuring logic 408 can be configured to generate obscuration data, for one or more categories, to function as selectors or instructions for use by the privacy protected image output logic 410. For example, the obscuring logic 408 can be configured to include encryption-based reversible obscuring of one or more categories of identity-correlated regions. In such implementation, the obscuring logic 408 can be configured to generate, for the one or more categories of identity-correlated objects, category-appropriate encryption parameters and to provide the parameters to the privacy protected image output logic 410.

It will be understood that the respective graphic blocks representing the image buffer 404, the identity-correlated region detection logic 406, the obscuring logic 408, and the privacy protected image output logic 410 represent logic functions. Neither the per-block partitioning of functions and features, nor the arrangement of the graphic blocks is intended as any limitation of implementations to any specific architecture, technology, arrangement or geographic distribution of hardware. For example, various combinations of, or all of the image buffer 404, identity-correlated region detection logic 406, obscuring logic 408, and privacy protected image output logic 410 may be implemented using a processor having access to an instruction memory that can store, in a tangible medium, processor-executable instructions that can cause the processor to perform the logic blocks' described functions.

For example, a contemplated implementation can include merging the identity-correlated region detection logic 406 and the obscuring logic 408, into a merged logic. An implementation of the merged logic may also feature, in association with detecting one or more categories of identity-correlated objects for reversible obscuring, a direct provision of encryption parameters to the privacy protected image output logic 410.

Figure 5:
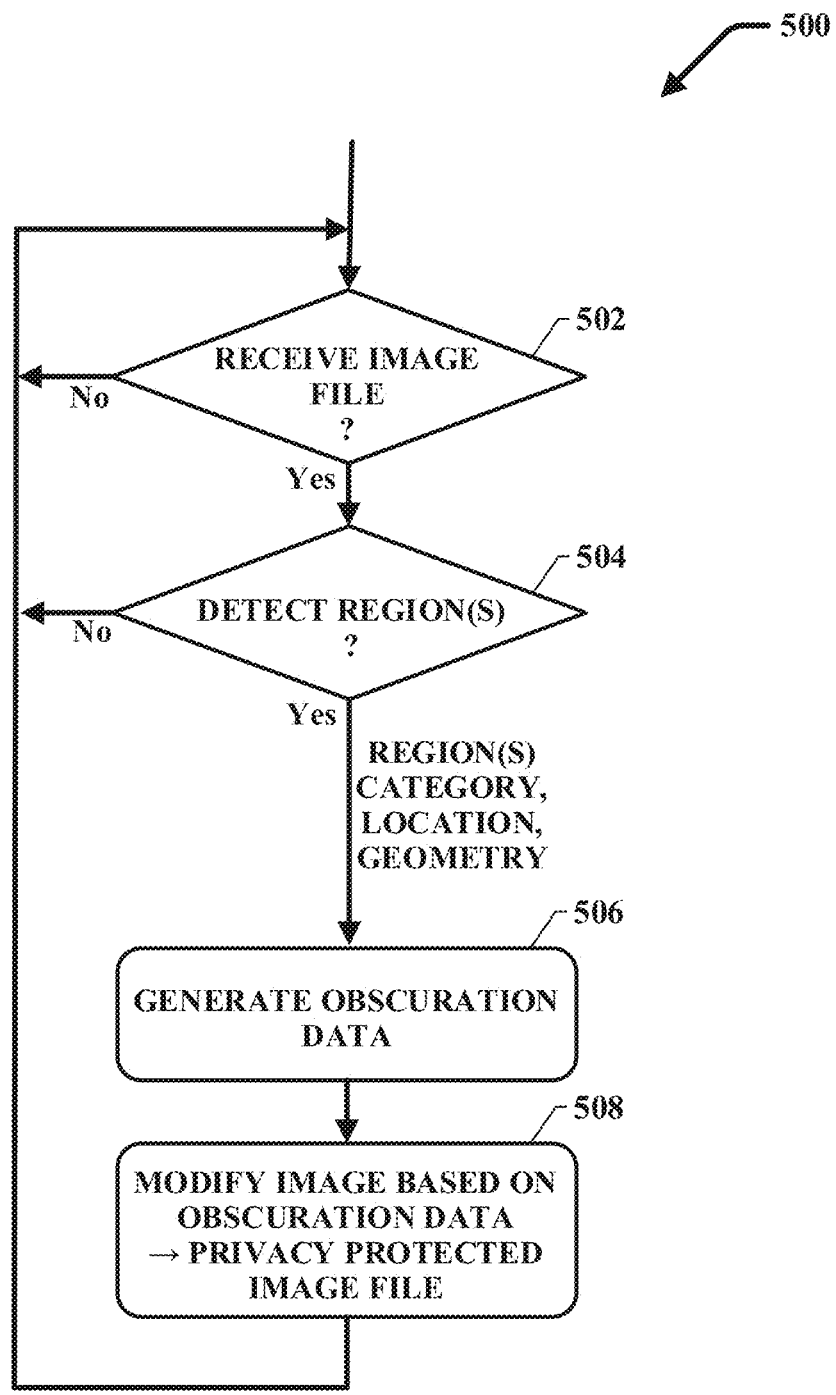
FIG. 5 shows a logic flow chart for various operations in another process in privacy-aware image capture in accordance with the present disclosure, including example operations in an implementation of the FIG. 4 identity-correlated object obscuring logic.

FIG. 5 shows a logic chart for a flow 500 of operations in a process in one or more methods for privacy-aware image capture in accordance with the present disclosure. Description of certain examples of the flow 500 operations, and aspects thereof, include references to FIG. 4. The references are not to be understood as limiting practices in accordance with the flow 500 to FIG. 4.

Example operations in the flow 500 can start upon receipt 502 of a digital image, e.g., an image IMG from the FIG. 4 imaging device 402. From receipt 502, the flow 500 can proceed to detection 504, where applied operations can detect whether the digital image includes one or more categories of identity-correlated objects. The detection 504 operations can be performed, for example, by the above-described system 400 identity-correlated region detection logic 406. If the detection 504 result is "No," the flow 500 can return to 502. If the detection 504 result is a positive result, e.g., "Yes," the flow 500 can proceed to obscuring 506. Proceeding from detection 504 to obscuring 506 can include carrying information about the detected instances of identity-correlated object categories, such as category, and the location, and geometry of the detected instance. Examples are labeled in FIG. 5, adjacent the flow arrow that extends from detection 504 to obscuring 506. Determination of such information is also described above in reference to the identity-correlated region detection logic 406.

Obscuring 506 can include generating identity-correlated object category obscuring data, for example, based at least in part on category information from the detection 504. The flow 500 can then proceed from the obscuring 506 to privacy-protected image outputting 508. Privacy-protective image outputting 508 operations can include modifying, e.g., obscuring the detected instances of identity-correlated object categories, in the original captured image, based at least in part on detected and data generated in the obscuring 506.

One example obscuring 506 will be described assuming the identity-correlated region detection logic 406 is configured to detect faces as a first category object and license plate numbers as a second category object. The example obscuring 506 will also assume a configuration in which faces are encrypted by an access key reversible encryption, such as a public key encryption, and license plates are irreversibly obscured, e.g., Gaussian blurring, masked. In the example, operations in the obscuring 506 can include generating encryption parameters and generating Gaussian blurring parameters, e.g., for use by the obscuration logic 408. As one alternative, the identity-correlated region detection logic 406 can be configured to provide object category to the obscuration logic 408, and the obscuration logic 408 can be configured to provide only the obscuration type to the privacy protected image output logic 410.

Figure 6:
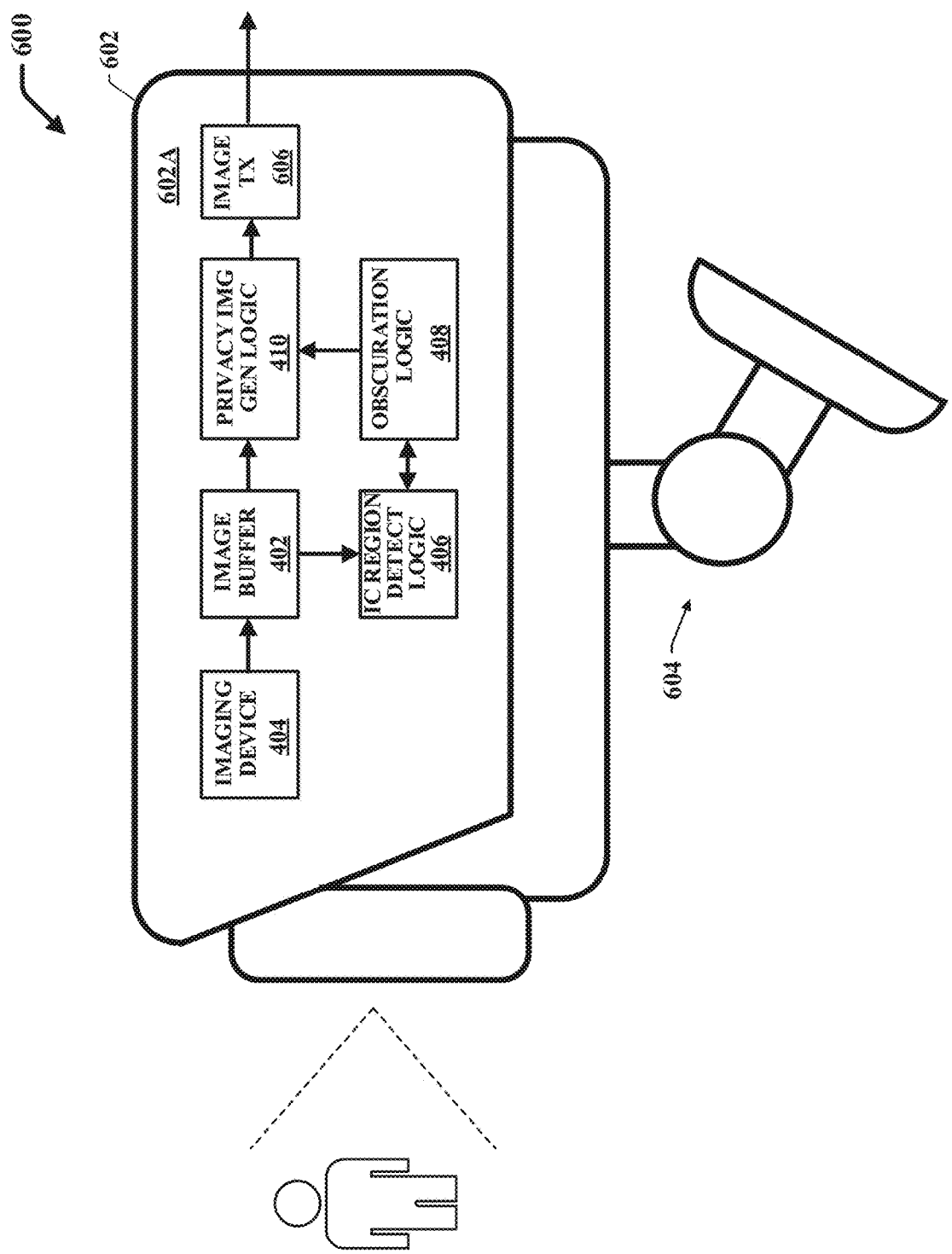
FIG. 6 shows a functional block schematic of another system for privacy-aware image capture in accordance with the present disclosure, providing an integrated image capture/identity-correlated object detect and obscuration.

FIG. 6 shows a functional block schematic of system 600 for privacy-preserving image capture in accordance with the present disclosure. The system 600 includes an integrated image capture/obscuration device 602, that can include a housing that encloses a device interior 602A. Supported within the device interior 602A can be a system for privacy-aware image capture in accordance with one or more disclosed embodiments, such as the system 400. The system 600 can also include motor-driven mount 604 and can include an electronic image transmitter 606, configured to communicate the privacy protected image to a receiver device that can be external to the housing.

Figure 7:
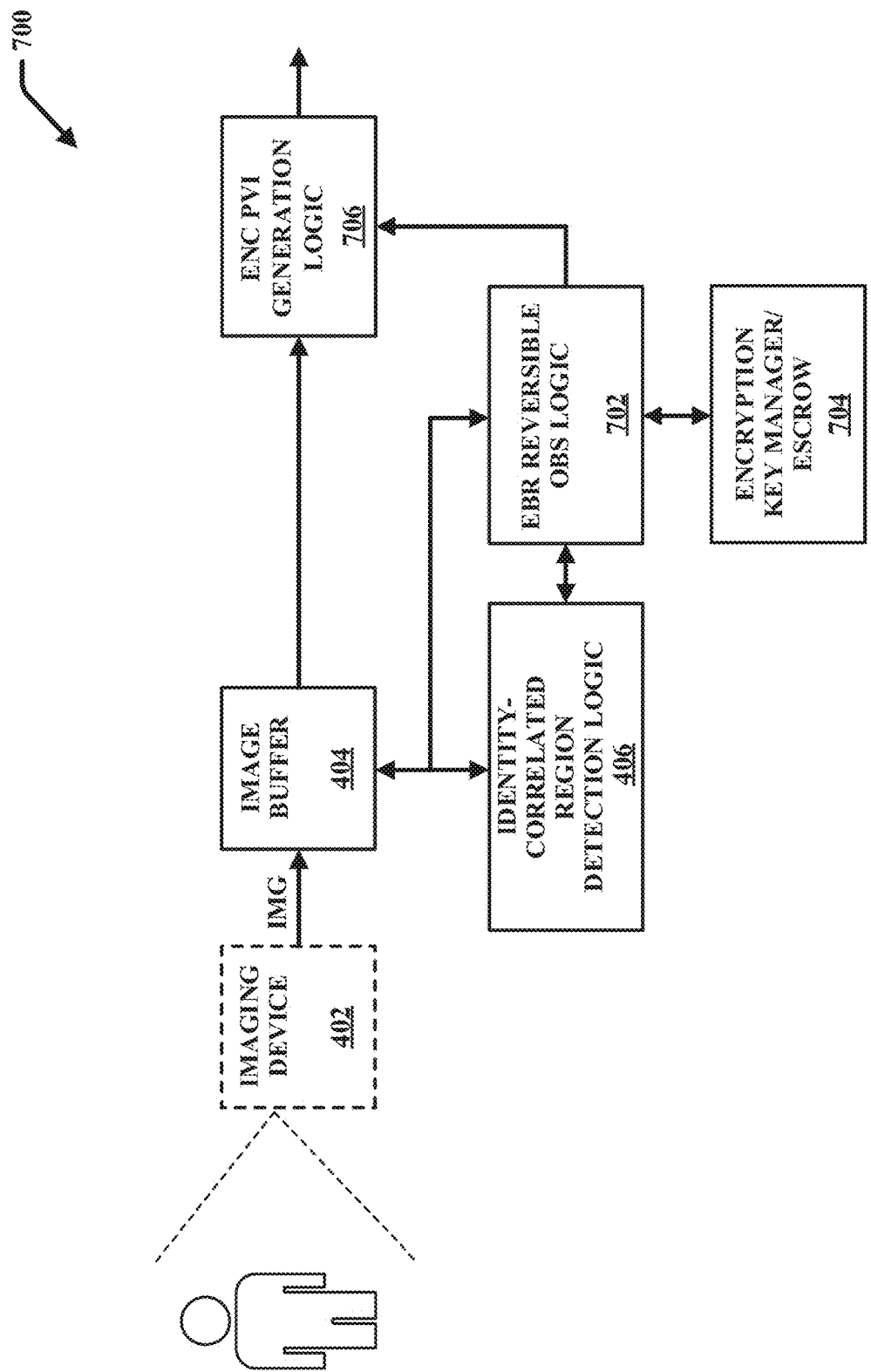
FIG. 7 shows a simplified functional block diagram of another system for privacy-aware image capture in accordance with the present disclosure, which includes a key-access reversible obscuring of various identity-correlated objects, with key management.

FIG. 7 shows a simplified functional block diagram of a system 700 for privacy-aware image capture in accordance with the present disclosure. Features of the system 700 can include key-access reversible obscuring of one or more categories of identity-correlated objects. To focus description on example key-access obscuring features, the FIG. 7 implementation of system 700 is shown incorporating the system 400 imaging device 402 (or receipt of images from an imaging device such as 402), image buffer 404, and identity-correlated region detection logic 406. The system 700 can include an encryption-based reversible obscuring logic 702 (labeled on FIG. 7 as "EBR Reversible OBS Logic" 702) and can include an encryption key management logic 704 (labeled on FIG. 7 as "ENC-Key MNGT Logic" 704), and an encryption-based privacy image output logic 706 (labeled on FIG. 7 as "ENC PVI Generation Logic" 706).

The encryption key management logic 704 can be implemented, for example, as a distributed resource. As one non-limiting example, implementation of the encryption key management logic 704 can include key generation resources, or portions thereof, being local to, e.g., incorporated within resources implementing the encryption-based reversible obscuring logic 702. Such implementation can also include decryption key custodial or escrow resources such as, for example, can be maintained by third parties (e.g., an independent organization).

In an aspect, the encryption key management logic 704 can be configured to generate a different encryption key each for new image IMG. The encryption-based privacy image output logic 706 can be correspondingly configured to apply that specific key to encrypt, i.e., effectuate reversible obscuring, of each identity correlation region. For example, assuming faces are the identity-correlated objects, a first key may be used for a first face while respective different keys used through "N" keys for respective "N" faces). The foregoing can be applied to other types of privacy related data. In other embodiments, different keys can be used for different types of privacy related data. For example, a first key can be used to encrypt facial data while another key can be used to encrypt license plate data. In this way, selective access to relevant privacy related data can be parceled out without giving access to specified data.

FIGS. 8A, 8B, and 8C graphically show illustrative stages of receiving an image of a random subject person, applying various detection and obscuration data generating processes in accordance with this disclosure, and outputting a replacement, privacy preserving image of the subject person. FIG. 8A shows a graphic representation of a captured image of the random subject person, the image including a face positioned 802 above an abstracted torso 804. Description will reference FIG. 4, assuming the system 400 is configured such that subjects' faces are identity-correlated objects and will reference FIG. 5.

Referring to FIGS. 4, 5, and 8A, an image data corresponding to the FIG. 8A can be stored in the image buffer 404 and, referenced to the flow 500, operations can be at 506. Therefore, it will be assumed that operation by the identity-correlated region detection logic 406 detected the random subject person's face, and correspondingly provided detection information to the obscuration logic 408. It will also be assumed that the obscuration logic 408, in response, generated an obscuration data, which is graphically represented as obscuration region or obscuration data 806 in FIG. 8B (hereinafter "obscuration data"). The obscuration data 806 can be, for example, an irreversible blurring or mask. Alternatively, the obscuration data 806 can be an access-key based reversible obscuration. From generating the FIG. 8B obscuration data 806, the system 400 can proceed to form and output a replacement image, such as the example in FIG. 8C, based at least in part on the FIG. 8B obscuration data 806 and the original image in FIG. 8A. Referring to FIGS. 4 and 5, such operations may be performed at 508, for example by the privacy protected image output logic 410, with information from the obscuration logic 408.

As can be seen from FIG. 8B the obscuration data 806 corresponds to a location, shape and dimension that approximately corresponds to the subject's face. It will be understood that "approximately" means accurate to a degree such that recognition of the face has an acceptable level of difficulty.

Figures 9A, 9B, 9C:
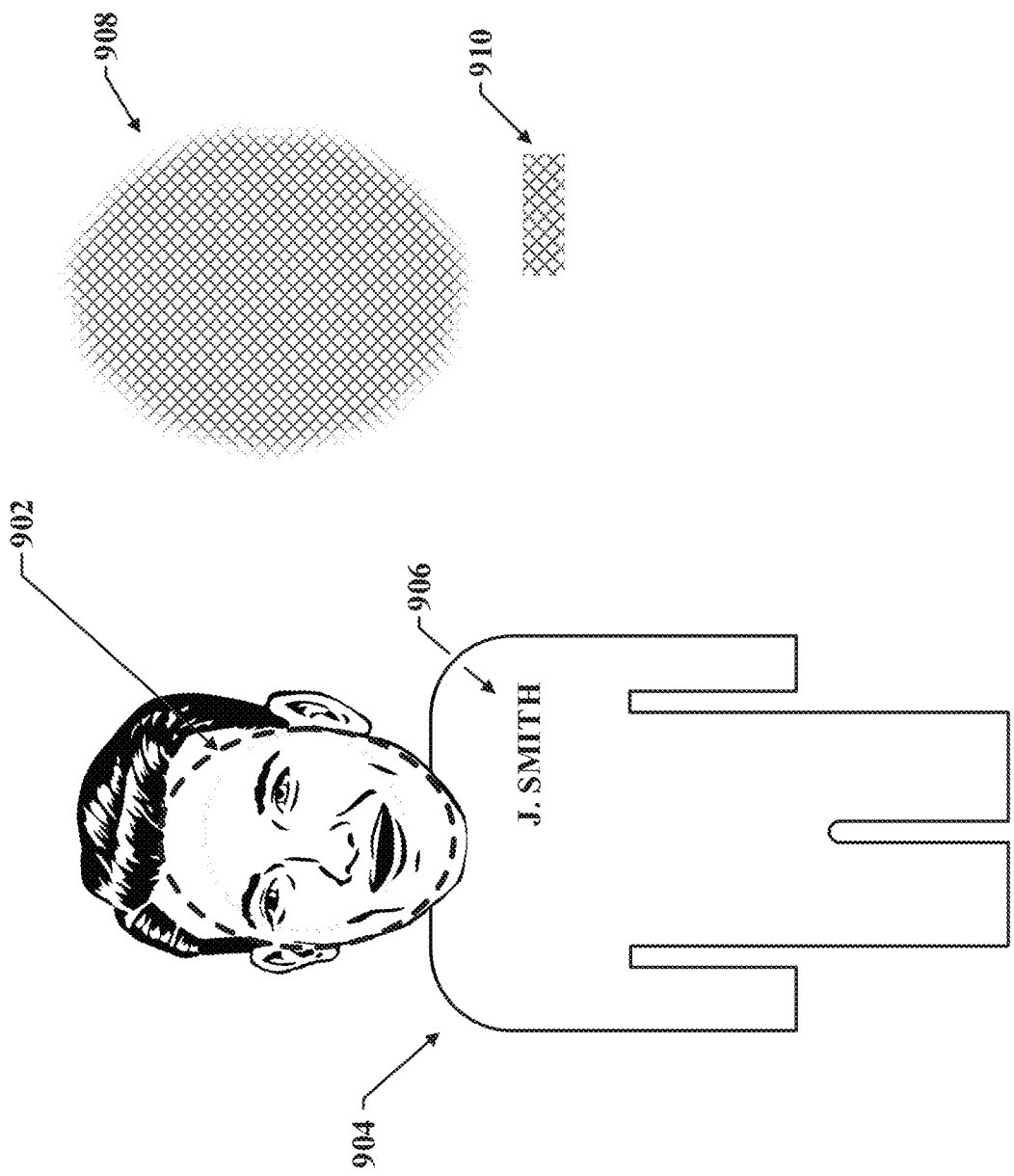
FIG. 9A shows aspects of a random subject, including a face above an abstracted torso, and a nametag on the subject's shirt.
FIG. 9B shows example obscuring regions, corresponding to the FIG. 9A face and nametag.
FIG. 9C shows a replacement privacy preserving image, resulting from modifications of the FIG. 9A image, based at least in part on the FIG. 9B example obscuring regions corresponding to the FIG. 9A face and nametag.

FIGS. 9A, 9B, and 9C show illustrative stages of receiving an image of a random subject person, and generating a replacement, privacy preserving image of the subject person, applying example processes in accordance with this disclosure. FIG. 9A shows the subject's face 902 positioned above an abstracted torso 904, and name tag 906 that is on or affixed to the subject's apparel. Referring to FIGS. 3, 4, and 9A, an image data corresponding to the FIG. 9A can be stored in the image buffer 404 and, referenced to the flow 300, operations can be at 306. It will be assumed that operations, e.g., by the identity-correlated region detection logic 406, detected the face 902 and the name tag 906, categorized the face as, for example, category 1 and the name tag as category 2. It will be assumed that the identity-correlated region detection logic 406 provided detection information to the obscuration logic 408. It will also be assumed that the obscuration logic 408 in response generated, in accordance with, e.g., flow 300 first type obscuring 308-1, a first obscuration data 908 and generated, in accordance with, e.g., flow 300 second type obscuring 308-2, a second obscuration data 910. The first obscuration data 908 can be, for example, a first access-key based reversible obscuration and the second obscuration data 910 can be, for example, a second access-key based reversible obscuration. The system 400 can then proceed to output, based at least in part on the FIG. 9B first obscuration data 908, second obscuration data 910, and the original image in FIG. 9A, a privacy-protecting replacement image, such as the example shown in FIG. 9C. Referring to FIG. 4, operations of outputting the replacement image may be performed by the privacy protected image output logic 410 with information from the obscuration logic 408.

Figure 10A:
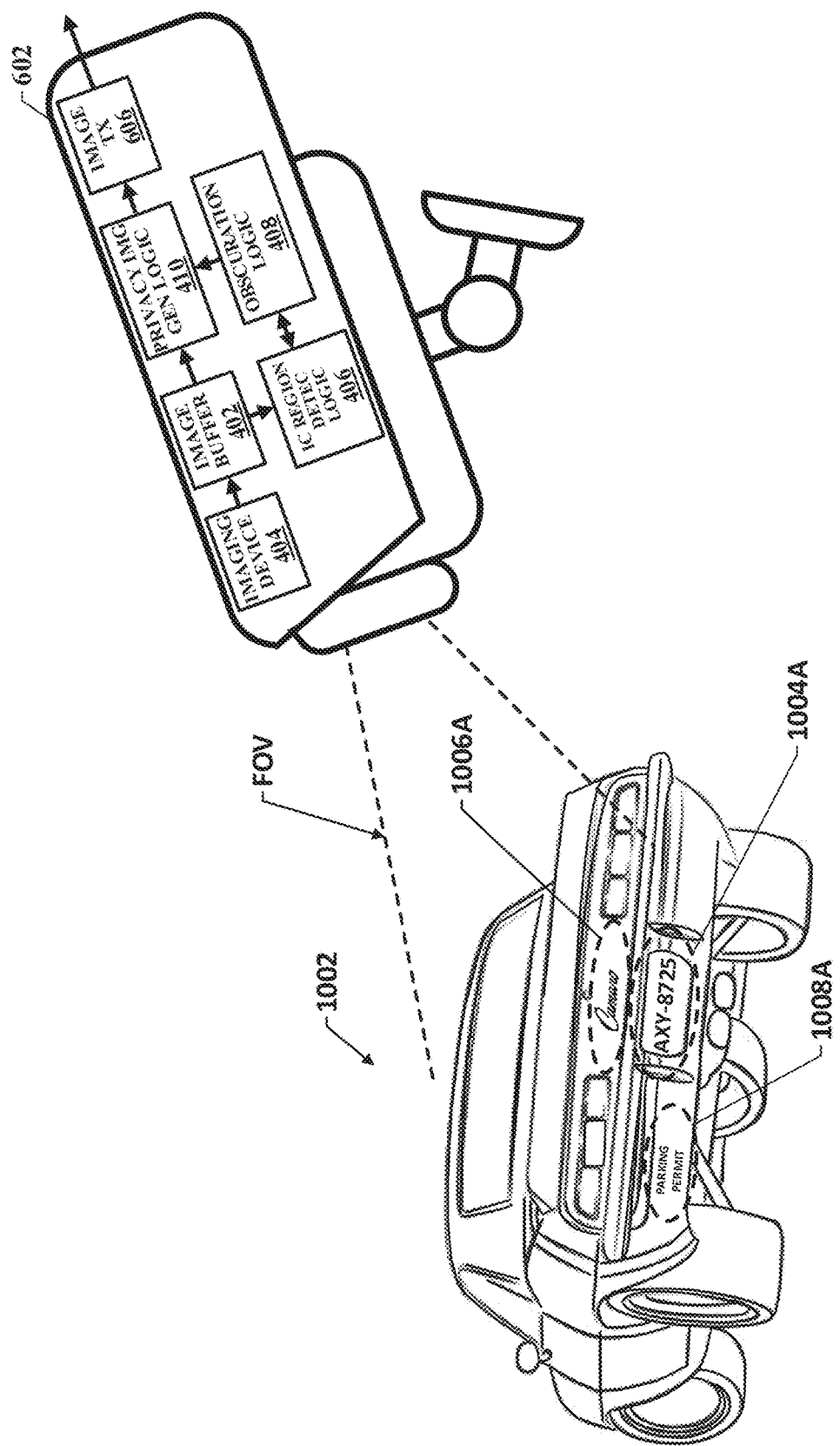
FIG. 10A illustrates a capturing of an image of an automobile, with example identity-correlated objects, on a privacy aware image capture system in accordance with the present disclosure.

FIG. 10A shows a functional block schematic of portions of another system for privacy-aware image capture in accordance with the present disclosure. The FIG. 10A system is shown featuring a roadway observation image capture device, implemented for purposes of example by the FIG. 6 integrated image capture/obscuration device 602 described above. Within a field of view FOV of the integrated image capture/obscuration device 602 is shown an automobile 1002, bearing a nameplate having a form labeled 1004A and bearing a license plate number with a visible form 1006A. For purposes of example, the automobile 1002 is also shown bearing a parking pass sticker having a visible form 1008A The integrated image capture/obscuration device 602 in FIG. 10A can be configured to perform a flow such as shown in FIG. 3. Referring to FIG. 3, categorizing 306, automobile nameplates will be assumed as a first identity-correlated object category, automobile license plate numbers as a second identity-correlated object category, and parking stickers as a third identity-correlated object category. Referring to FIG. 3, logic flow blocks 308, the first type obscuring 308-1 will be assumed, for example, a first type reversible obscuring, such as a public-key encryption first type obscuring. The second type obscuring 308-2 will be assumed, for example, an irreversible obscuring, such as a Gaussian blurring, making, or replacement by a synthetic object of the detected category. The third type obscuring, represented for example, by block 308-N, will be assumed as another public key encryption.

Figure 10B:
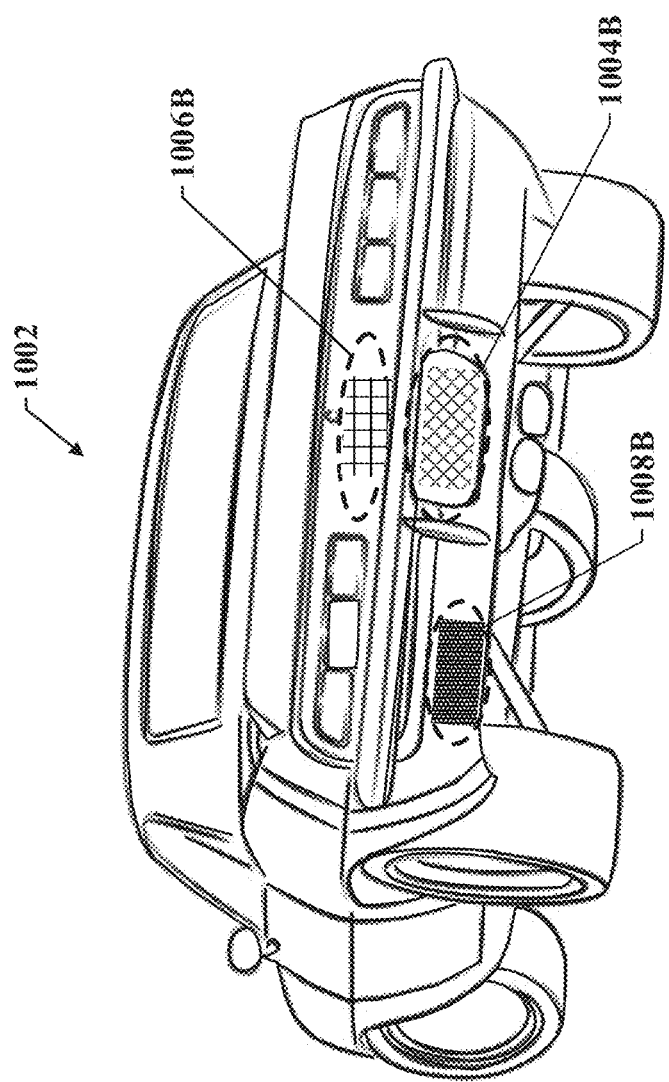
FIG. 10B illustrates a privacy preservation replacement of the FIG. 10A image, providing category-specific obscuring of identity-correlated objects, via methods in accordance with the present disclosure.

FIG. 10B illustrates a privacy preservation replacement of the FIG. 10A image, applying the above-described first, second, and third obscuring types to the license plate, nameplate, and parking permit respectively. The privacy preservation replacement shows the visible first obscured form of the license plate as a first cross-hatching 1004B, the visible second obscured form of the nameplate as a second cross-hatching 1006B, and the visible third obscured form of the parking permit as a third cross-hatching 1008B. An entity that possesses the decryption key for one of the first type obscuring and second type obscuring will be able to view a corresponding one of, but not both of, the original license plate form labeled 1004A and parking permit visible form 1008A. In this example, no entity will be able to view the original nameplate visible form 1006A, as the second type obscuring was irreversible.

Figure 11:
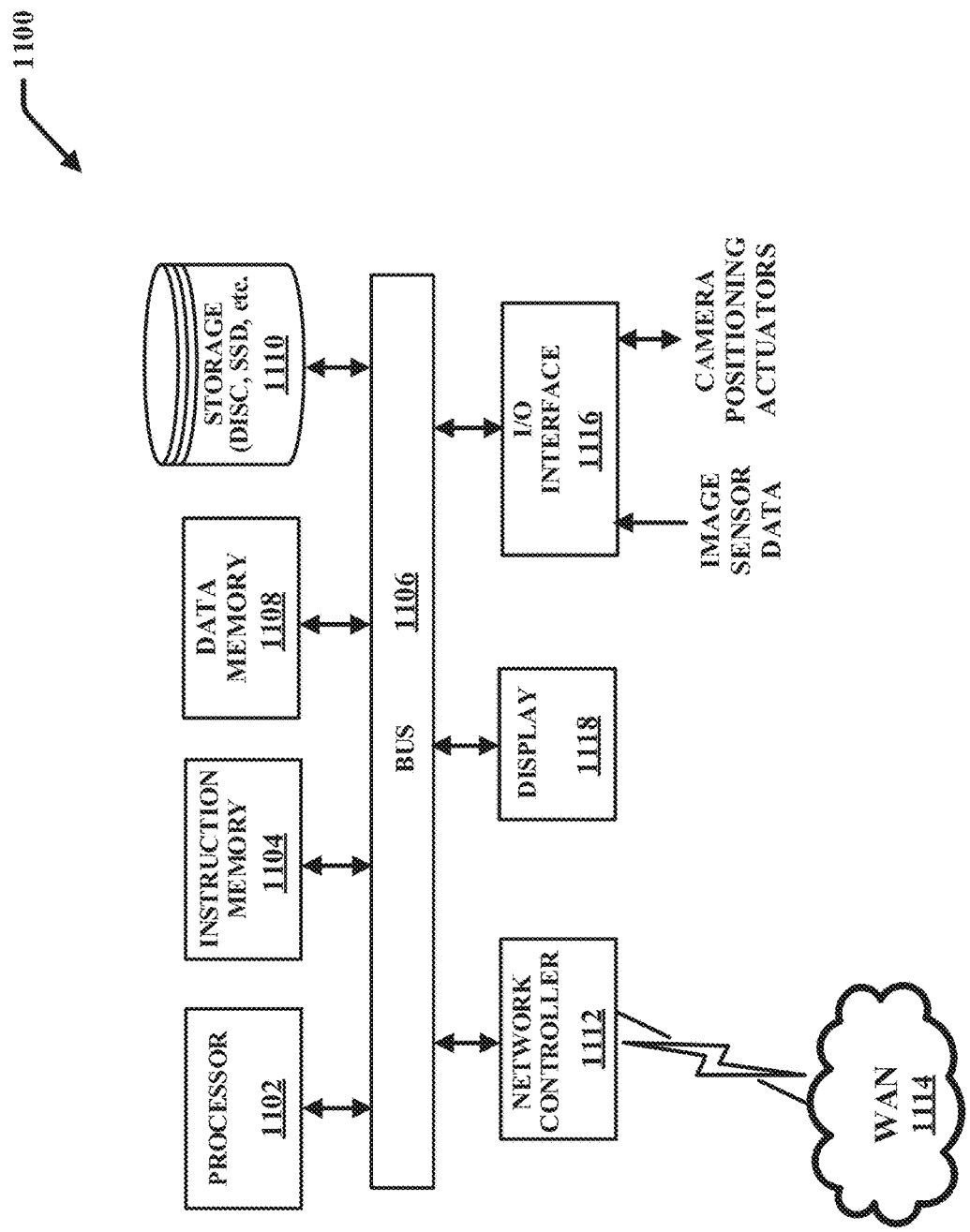
FIG. 11 shows a simplified functional block schematic of a computer system on which aspects of systems and methods in accordance with the present disclosure can be practiced.

FIG. 11 shows a simplified functional block schematic of a computer system 1100 on which aspects of systems and method in accordance with the present disclosure can be practiced. An implementation of the computer system 1100 can include a processor 1102 and an instruction memory 1104 that can be coupled to one another through a bus 1106. Implementations of the processor 1102 can include, but are not limited to, ASIC (application-specific integrated circuit), FPGA (field programmable gate array), a generic-array of logic (GAL), and their equivalents. The computer system 1100 can include a data memory 1108 and a large capacity storage 1110, each of which can be coupled, for example, via the bus 1106 to the processor 1102. It will be understood that the instruction memory 1104 and the data memory 1108 are logic functions and can be implemented, for example, as respective resources of a shared memory resource.

The instruction memory 1104 and data memory 1108 can be implemented as computer readable, non-transitory storage media, (e.g., ROM (read-only memory), EPROM (electrically programmable read-only memory), EEPROM (electrically erasable programmable read-only memory), flash memory, static memory, DRAM (dynamic random-access memory), SRAM (static random-access memory).

The computer system 1100 may be coupled, for example, via a network controller 1112, to a network resource such as the WAN (wide area network) 1114, such as the Internet or a local intranet. The computer system 1100 can include an input/output interface 1116, which can provide an input port for receiving image data from the integrated image capture/obscuration device 602. The input/output interface 1116 can also provide interface, for example, to positioning actuators for the obscuration device 602. The computer system can also include a display 1118.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

CONCLUSION

Although the subject matter has been described in language specific to example structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A system for generating a privacy protected image comprising:
   an image capture device configured to receive an image; wherein the image is a still image, a sequence of images, or a moving picture image;
   a detection logic configured to execute a detection process configured to:
      detect one or more identity-correlated object categories;
      determine category instance information about said one or more identity-correlated object categories;
   an obscuring logic configured to execute an obscuring process configured to obscure data in a format;
   the detection logic and obscuring logic configured to include an automatic category-specific selecting between irreversible obscuring and reversible obscuring;
   a privacy protected image output logic configured to generate the privacy protected image using the object category, obscuration type, and the image; and
   a processor having access to an instruction memory configured to store, in a tangible medium, processor-executable instructions that causes the processor to perform functions in the detection logic, obscuring logic, and the privacy protected image output logic.

2. The system of claim 1, comprising a compression coder-decoder configured to:
   receive the image; wherein the image is a moving picture image in a compressed format;
   convert the moving picture image to an uncompressed format; and
   compress the moving picture image back to the compressed format.

3. The system of claim 1, configured to detect and categorize a plurality of separate identity-correlated regions in the image; the obscuring logic configured to detect and apply commensurate obscuring to particular combinations of identity-correlated regions.

4. The system of claim 3, comprising a privacy protected image output logic configured to output a replacement image based on information received from the obscuring logic.

5. The system of claim 4, wherein the obscuring logic is configured to:
   include encryption-based reversible obscuring into one or more categories of identity-correlated regions;
   generate category-appropriate encryption parameters and to provide the parameters to the privacy protected image output logic.

6. The system of claim 1, wherein the image comprises two or more instances of a first category identity-correlated regions and two or more instances of second category identity-correlated regions; and the obscuring logic configured to apply:
   a first type of obscuring to each of the two or more first category identity-correlated regions; and
   a second type of obscuring to each of the two or more second category identity-correlated regions.

7. The system of claim 1, wherein the obscuring logic is configured to:
   detect faces as a first category object and license plate numbers as a second category object; and
   encrypt faces with an access key reversible encryption; and irreversibly obscure the license plate numbers.

8. The system of claim 7, the obscuring logic is configured to generate encryption parameters and Gaussian blurring parameters.

9. The system of claim 1, wherein the detection logic is configured to provide an object category to the obscuring logic; and the obscuration logic is configured to provide an obscuration type to the privacy protected image output logic.

10. The system of claim 1, wherein the obscuring is configured to generate obscuration data of a person's face; wherein the obscuration data is an irreversible blurring, a mask, or access-key based reversible obscuration.

11. The system of claim 1 configured to categorize at least two of:
   automobile nameplates in the image as a first identify-correlated object category,
   automobile license plates numbers as a second identity correlated object category, and
   parking sticker as a third correlated object category.

12. The system of claim 1 wherein the detection logic and obscuring logic is configured to:
   detect and obscure data on every $r^{th}$ frame; wherein the detection logic and obscuring logic is configured to detect identity-correlated regions and obscure those regions on every $r^{th}$ frame;
   generate new data for a location of the region in the $r^{th}$ frame;
   generate per-frame movement data for a motion-compensated, shifted location version of the new data for obscuring the region in intervening frames;
   detect and generate new data for identity-correlated region in an I-frame;
   generate a P-frame or B-frame version of the new data; and
   output a privacy protected image using the I-frame new data and the P-frame or B-frame version of the new data.

13. The system of claim 1 wherein the detection logic and obscuring logic is configured to provide a category-specific selection between reversible and irreversible obscuring, a selection among different types of reversible obscuring; and a selection among different types of irreversible obscuring.

14. The system of claim 1 wherein the detection logic and obscuring logic is configured to:
   provide irreversible obscuring for regions determined to likely have objects of any category within one group, and reversible obscuring for regions determined to likely have objects of any category within another group;
   generate obscuring data based a first and second factor; said first factor is the specific detected identity-correlated object category; said second factor is whether the obscuring process is configured to apply reversible or irreversible obscuring; and
   apply reversible or irreversible obscuring based on which specific detected identity correlated objected category is detected by the detection process.

15. A method for generating a privacy protected image comprising the steps of:
   receiving an image; wherein the image is a still image, a sequence of images, or a moving picture image;
   detecting one or more identity-correlated object categories with a detection process;
   determining category instance information about said one or more identity-correlated object categories with the detection process;
   obscuring data with an obscuring process;
   generating an object category and an obscuration type;
   the steps of detecting and obscuring including
      automatic category-specific selecting between irreversible obscuring and reversible obscuring; and
   generating the privacy protected image using the object category, obscuration type, and the image.

16. The method of claim 15, comprising the step of receiving the image with a compression decoder; wherein the image is a moving picture image in a compressed format.

17. The method of claim 16, comprising the steps of:
   converting the moving picture image to an uncompressed format; and
   detecting and obscuring identity-correlated regions of the moving picture image.

18. The method of claim 17, comprising the step of compressing the moving picture image back to the compressed format.

19. The method of claim 17 comprising the step of a privacy protected image output logic outputting a replacement image based on information received from an obscuring logic.

20. The method of claim 19, comprising a step of the obscuring logic including encryption-based reversible obscuring into one or more categories of identity-correlated regions.

21. The method of claim 20, wherein the obscuring logic generates category-appropriate encryption parameters and to provide the parameters to the privacy protected image output logic.

22. The method of claim 18, comprising the steps of:
   detecting and categorizing a plurality of separate identity-correlated regions in the image;
   providing an identity-correlated region detection logic; and
   said identity-correlated region detection logic detecting and applying commensurate obscuring to particular combinations of identity-correlated regions.

23. The method of claim 15, comprising the steps of: detecting faces as a first category object and license plate numbers as a second category object.

24. The method of claim 15 wherein the detection process and obscuring process is configured to perform the steps of:
   detecting and obscuring every $r^{th}$ frame;
   in the $r^{th}$ frame, detecting identity-correlated regions with the detection process and obscuring those regions with the obscuring process;
   generating new data for a location of the region in the $r^{th}$ frame;
   generating a per-frame movement data for a motion-compensated, shifted location version of the new data; the obscuring process using the movement data to obscure the identity-correlated regions in intervening frames;
   detecting and generating new data for identity-correlated regions in an I-frame;
   generating a P-frame or B-frame version of the new data; and
   outputting a privacy protected image using the I-frame new data and the P frame or B-frame version of the new data.

25. The method of claim 15 wherein the detection process and obscuring process is configured to perform the steps of:
   selecting among different types of reversible obscuring;
   selecting among different types of irreversible obscuring; and
   selecting irreversible obscuring for regions determined to likely have objects of any category within one group, and reversible obscuring for regions determined to likely have objects of any category within another group.

26. The method of claim 15 wherein the detection process and obscuring process is configured to perform the steps of:
   generating obscuring data based a first and second factor; said first factor is the identity-correlated object category that was detected by the detection process; said second factor is whether the obscuring process is configured to apply reversible or irreversible obscuring;

determining whether to apply reversible obscuring or irreversible obscuring to the detected regions based on which identity correlated objected category is specifically detected by the detection process; and applying the reversible obscuring or irreversible obscuring to the detected regions.

27. A system for generating a privacy protected image comprising:

an image capture device configured to receive an image; wherein the image is a still image, a sequence of images, or a moving picture image;

a detection logic configured to execute a detection process configured to:

detect one or more identity-correlated object categories;

determine category instance information about said one or more identity-correlated object categories;

an obscuring logic configured to execute an obscuring process configured to obscure data in a format:

the detection logic and obscuring logic configured to:

provide automatic selection of a type of obscuring to be used based on the detected category; wherein said automatic selection includes automatically selecting among a plurality of different, category specific types of reversible obscuring; or include an automatic category-specific selecting between irreversible obscuring and reversible obscuring;

a privacy protected image output logic configured to generate the privacy protected image using the object category, obscuration type, and the image; and a processor having access to an instruction memory configured to store, in a tangible medium, processor-executable instructions that causes the processor to perform functions in the detection logic, obscuring logic, and the privacy protected image output logic;

wherein the system is configured to reversibly obscure at least one of the identity-correlated object categories and irreversibly obscure at least one of the identity-correlated object categories.

28. A method for generating a privacy protected image comprising the steps of:

receiving an image; wherein the image is a still image, a sequence of images, or a moving picture image;

detecting one or more identity-correlated object categories with a detection process;

determining category instance information about said one or more identity-correlated object categories with the detection process;

obscuring data with an obscuring process;

generating an object category and an obscuration type;

the steps of detecting and obscuring including:

automatic selecting among a plurality of different, category-specific types of reversible obscuring; or automatic category-specific selecting between irreversible obscuring and reversible obscuring; and generating the privacy protected image using the object category, obscuration type, and the image;

reversibly obscuring at least one of the identity-correlated object categories and irreversibly obscuring at least one of the identity-correlated object categories.

* * * * *